United States Patent [19]

Yang

[11] 4,250,088

[45] Feb. 10, 1981

[54] DEMETHYLATED LIGNIN AND PROCESS

[75] Inventor: Lau S. Yang, Hightstown, N.J.

[73] Assignee: American Can Company, Greenwich, Conn.

[21] Appl. No.: 68,180

[22] Filed: Aug. 20, 1979

[51] Int. Cl.³ ............................................. C07G 39/00
[52] U.S. Cl. ................................................ 260/124 R
[58] Field of Search ........................................ 260/124

[56] References Cited
PUBLICATIONS

Brauns, "The Chemistry of Lignin", (1952) 432–434.

*Primary Examiner*—Delbert R. Phillips
*Attorney, Agent, or Firm*—Robert P. Auber; Ira S. Dorman; Ernestine C. Bartlett

[57] ABSTRACT

Lignin compounds are demethylated without degradation of the lignin polymer backbone to provide a highly reactive lignin and methyl chloride as products. The reaction is applicable to Kraft lignin or lignosulfonates derived from spent sulfite liquor. Demethylation is accomplished by reacting the lignin material at an elevated temperature with an amine hydrohalide salt.

16 Claims, No Drawings

DEMETHYLATED LIGNIN AND PROCESS

BACKGROUND OF THE INVENTION

Lignin is derived from wood as a by-product in the pulping process and is among the most abundant, renewable, natural products on earth. Tremendous quantities of lignin are produced each year that are generally disposed of as waste materials. Relatively small amounts of lignin are used commercially as dispersing and grinding agents, sequestering agents, in vanillin production and in reactions for the production of sulfur-containing compounds.

Lignin materials have found limited utilization commercially because of the complexity, chemically and physically, of lignin. In spite of extensive research in the art over a long period, there remins a great deal of uncertainty as to its properties and reactions. As it occurs in natural lignocellulose, lignin is a complex substance in the nature of a nonuniform polymeric structure in which the basic molecular configuration is believed to be derived from repeating propyl phenol units. The exact chemical structure of lignin is not known although the presence of ether linkages within the structure and the presence of benzene rings, methoxy groups and both aliphatic and phenolic hydroxyl groups is well established. Kraft lignin is known to be a polymer of substituted catechol with more than half of the potentially reactive aromatic hydroxyl groups being blocked by methyl groups. If such methyl groups could be removed by an economically feasible method, the resulting material should be highly suitable for subsequent reaction to produce useful products. However, like common aromatic ether cleavages, the demethylated material is generally either too reactive to survive the severe reaction conditions necessary for demethylation or it is converted into a different material under the reaction conditions. Similarly, demethylation of lignosulfonates from spent sulfite liquors in general results in materials that are so unstable in the reaction mixture that either substantial decomposition occurs or the polymer is converted into a different material.

It is known that lignin materials may be treated to cleave the methoxy groups. For example, U.S. Pat. No. 2,816,832 produces dimethyl sulfide from Kraft black liquor by autoclaving at 250° C. under pressure of 680 to 820 psi in the presence of elemental sulfur; U.S. Pat. No. 2,840,614 produces methyl mercaptan by treating lignin-containing solutions with inorganic sulfur materials capable of reacting with the methoxy groups of the lignin in an autoclave at 215°-220° C.; U.S. Pat. No. 2,908,716 treats spent liquors from alkaline pulping with methyl mercaptan to cleave the alkoxy group to form sulfides at 240° C. under autoclave pressure and U.S. Pat. No. 3,326,980 produces methyl mercaptan by pyrolysis of spent pulping liquors, i.e., by heating to decompose the lignin material in a furnace at 300° C. for 2 hours. Another method well known in the art as the Ziesel method, is an analytical tool for determining methoxyl content. In such method, lignin is demethylated by heating with HI at 150° C. and recovering methyl iodide. This method is a quantitative analytical tool rather than a preparation method. In this process, the demethylated lignin is neither isolated nor studied because of the strong acidic conditions. Each of the methods referred to above demethylates lignin to some extent. However, to my knowledge, no attempts have been made to preserve the lignin polymer backbone nor to recover the demethylated lignin as such, demethylation in these cases being merely incidental either to recovery of a sulfur-containing product or to the determination of methoxy content.

It has been reported in the literature by G. F. Zakis et al in *Khimiya Drevesiny*, 14, p. 98 (1973) that hydrolysis lignin may be demethylated by reaction with pyridinium hydrocholoride at 180° C. for 3 hours according to the general equation:

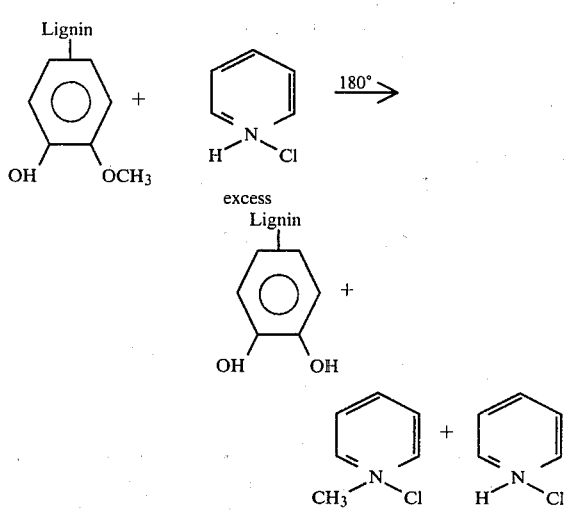

HYDROLYSIS LIGNIN

The method employs molten pyridinium chloride (having a melting point of 145° C.) as a reactant and recovers a water-soluble demethylated hydrolysis lignin. Hydrolysis lignin is a highly purified material derived from acid hydrolyzates in which the lignin backbone is substantially degraded. Acid hydrolyzates are derived from the digestion of lignocellulosic materials with dilute aqueous acid such as sulfuric acid at temperatures ranging from about 190° to 225° C. and pressures of about 200 to 400 psi, normally under the action of injected steam. The acid hydrolyzate thus produced will contain sugars such as xylose or glucose, furfural, humins, lignin decomposition products such as vanillin or other aromatic compounds, the hydrolysis lignin being the solid left in the hydrolyzate after separation of the sugars and other components. Thus, hydrolysis lignin is a highly purified, chemically altered lignin material that is quite different from Kraft lignin or spent sulfite liquor lignosulfonates.

In the Zakis et al procedure of demethylating hydrolysis lignin, after completion of the reaction, the mass is dissolved in water and acidified to pH 2 to precipitate the demethylated lignin (hereafter DL). The methyl pyridinium chloride by-product and excess pyridinium hydrochloride reactant are recoverable only with difficulty due to their high boiling points relative to the boiling point of the water in the mixture. Thus to recover such substances it is necessary to evaporate the water from the system, a requirement that makes the method economically unfeasible on a commercial scale. Moreover, pyridinium hydrochloride functions as a reagent in the Zakis et al process and is largely consumed during the reaction, again rendering the method relatively expensive particularly in view of the 3 to 1 excess of such material that is employed.

The present invention provides a process for the demethylation of Kraft lignin derived from the spent liquor emanating from sulfate or alkali pulping processes. The process is also applicable to lignosulfonates derived from spent sulfite liquor. Demethylation is accomplished by heating the lignin or lignosulfonate material in the presence of an amine hydrohalide salt without substantial degradation of the lignin polymer backbone and results in a water-insoluble, highly reactive lignin material and methyl halide. The process may be illustrated by the general equation:

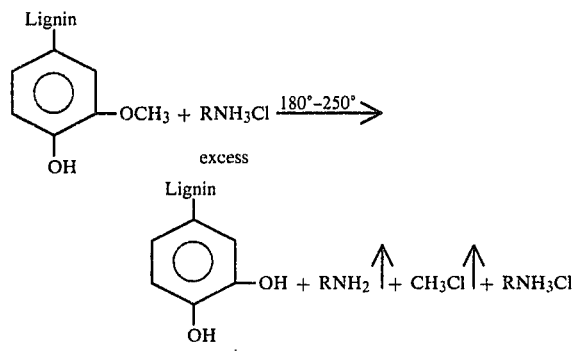

In the reaction, the DL is water-insoluble and precipitates from the reaction mixture when said mixture is admixed with water. The amine and methyl chloride are volatile at reaction temperatures and are readily recovered as distilled fractions during the course of the reaction. Excess amine hydrohalide salt may be recovered as such, if desired, or it may be decomposed by reaction with sodium hydroxide to generate additional free amine which distills off at relatively low temperatures. The process utilizes an amine hydrohalide salt having a melting point below reaction temperature, the amine component having a boiling point below the boiling point of water. Additionally, the amine salt must be capable of solvating the lignin material to provide a homogeneous reaction mixture. The amine component of the hydrohalide salt does not participate in the reaction. It appears to function as a hydrohalide carrier and is readily recovered. The amine is suitable for reaction with additional hydrogen halide for recycle to a subsequent demethylation reaction. Significantly, neither HCl nor HBr will demethylate lignin when unassociated with the amine carrier although HI in aqueous solution is apparently a sufficiently suitable reagent to effect demethylation as in the Zeisel method referred to hereinabove. Quarternary ammonium salts have also been found to be ineffective to cause demethylation.

The demethylation reaction results in a lignin structure wherein non-reactive 2,6-carbon atoms in the aromatic nucleii are rendered reactive. The demethylation reaction results in such 2,6-carbon atoms being positioned either ortho or para to a phenolic hydroxyl group apparently through demethylation of chemically inert methyl ether groups, formed by the aromatic nucleii and methoxy groups in the original lignin, and conversion of such originally inactive groups to reactive hydroxyl groups. As a result of the increased reactive sites, the DL is suitable for further chemical modification through a variety of reactions. Additionally, the methyl halides produced are valuable products useful as local anesthetics, refrigerants, soil fumigants, insecticides and as chemical reagents in the synthesis of other compounds such as alcohols and esters, etc.

DETAILED DESCRIPTION OF THE INVENTION

The process of the invention is applicable with lignins obtained from the spent pulping liquor of Kraft or alkali pulping processes or from certain lignosulfonates derived from spent sulfite liquor.

Lignin from Kraft or alkali liquor may be recovered by any means known in the art. In one such method, the lignin-containing black liquor is acidified and the lignin, being insoluble in acidic medium, is precipitated and separated from the water-soluble salts which remain in the filtrate. The process is applicable with Kraft lignin derived from either a hardwood or softwood source. Preferred Kraft lignin will be acid precipitated from black liquor at a PH of about 3 although comparable results are obtained with lignin precipitated at pH of about 8. The softwood raw material is insoluble in water, contains about 13.5% methoxy, and about 5% phenolic hydroxyl groups while the hardwood raw material, also insoluble in water, will contain about 20% methoxy, and about 5% phenolic hydroxyl groups.

Lignosulfonates derived from spent sulfite liquor may also be employed in the process provided they have been purified to remove the major proportions of sugars and other lignin decomposition products and also provided they contain a relatively minor amount of sulfonic sulfur. Attempts to demethylate crude lignosulfonates with high sulfonic sulfur content, i.e., substantially above 5 weight percent, resulted in severe degradation of the lignosulfonate material. When lignosulfonates that have been purified to some extent and having a sulfonic sulfur content of less than about 5% are employed, it has been found that demethylation accompanied by desulfonation occurs without substantial degradation of the lignin material resulting in a product that is similar in solubility, methoxy content and phenolic hydroxyl content to the product derived by demethylation of Kraft lignin. Examples of suitable lignosulfonate materials include lignosulfonates derived from softwood or hardwood pulping liquors or from partially purified and/or desulfonated spent oxidized liquor residue from a vanillin recovery process as taught in U.S. Pat. No. 2,491,832 or other lignosulfonate materials which have been partially desulfonated or otherwise treated and having a sulfonic sulfur content of less than about 5 weight percent. Examples of such materials include lignosulfonates which are commercially available from American Can Company including those having the Trademarks Marasperse CB, an oxidized partially desulfonated softwood residue from a vanillin recovery process; and Maracell XE, an oxidized, partially desulfonated hardwood product; etc.

Demethylation according to the invention is accomplished by dissolving the lignin material in molten amine hydrohalide salt to provide a homogeneous mixture and heating at elevated temperatures which may range from about 180° C. to below the temperature at which the lignin material decomposes, preferably below about 250° C. Temperatures substantially above 250° C. are to be avoided since the lignin material will be degraded or will begin to decompose above this temperature. Temperatures substantially below 180° C. have been found to be ineffective in causing any significant degree of demethylation. Reaction times ranging from about 30 minutes to several hours have been found to be operable, the longer reaction times being necessary when the reaction temperature is in the lower end of the temperature range, and depending on the amine hydrohalide salt that is employed. It has been found, for example, with n-butyl amine, at 180° C., a 40% demethylation of Kraft lignin is achieved in about 4 hours while the same degree of demethylation can be obtained in 30 minutes at a temperature of 210° C. Complete demethylation in less than 30 minutes is realized with n-butylamine employing a temperature of about 240° C.

Proportions of lignin material to amine hydrohalide salt may vary within a wide range. For example, satisfactory results may be obtained when employing lignin to amine salt ratios of 1:2 to 1:10 parts by weight. Preferably, the ratio of reactants will be 1 part lignin material per 2 parts of amine hydrohalide salt.

Amine salts useful in the invention must melt below the reaction temperature and should comprise an amine having a boiling point that is below the boiling point of water and preferably below about 90° C. The amine salt must be capable of dissolving the lignin material under reaction conditions to provide a homogeneous reaction mixture. Suitable amine hydrohalide salts include primary, secondary and tertiary amine hydrochlorides and hydrobromides. Any of such salts are useful as long as it melts below reaction temperature, comprises an amine having a boiling point within the proscribed ranges and is sufficiently compatible with the lignin material to provide a homogenous reaction mixture. Preferably, the amine salt will comprise an aliphatic amine having 1 to 4 carbon atoms and especially a primary aliphatic amine having 1 to 4 carbon atoms in the aliphatic radicals. Such amine salts are well known in the art and include dimethylamine hydrochloride, ethylamine hydrochloride, trimethylamine hydrochloride, diethylamine hydrochloride, n-butylamine hydrochloride, n-propyl amine hydrochloride and the corresponding hydrobromide salts.

DESCRIPTION OF PREFERRED EMBODIMENTS OF THE INVENTION

The following specific examples of the process of this invention and of the DL product obtained thereby will serve to illustrate the invention.

EXAMPLE 1

100 grams of Kraft lignin derived from black liquor from a softwood source, having a phenolic hydroxyl content of about 5 weight percent, a methoxyl content of about 13.5 weight percent and soluble in aqueous sodium hydroxide, was mixed with 210 grams of n-butyl amine hydrochloride and the mixture was heated in an open vessel at 240° C. for 2 hours. During the course of the reaction n-butyl amine and methyl chloride were distilled off and recovered from the distillate. After 2 hours, completion of the reaction was visually observable due to the absence of volatiles distilling off. The resultant reaction mixture was poured into water and the precipitate recovered to yield 70 grams of demethylated Kraft lignin.

Chemical analysis of a sample portion of the demethylated lignin (DL) material using the Ziesel Method indicated a methoxy content of 0.15 weight percent. Phenolic hydroxyl content was determined by nuclear magnetic resonance (NMR) techniques and was determined to have increased to about 10 weight percent corresponding to an increase in the hydroxyl content of about 100%.

Molecular weight analysis by gel permeation chromatography revealed only a slight increase in molecular weight. The demethylated lignin produced was found to be soluble in aqueous sodium hydroxide and insoluble in water similar to the solubility of the original starting lignin material. Such similarities between the DL and the starting lignin material indicate that substantially complete demethylation has been accomplished by the reaction without deleterious effect on the lignin polymer backbone.

The melting point of the demethylated lignin was determined to be greater than 300° C. as compared to 240° C. for the original Kraft lignin.

The demethylated product was subjected to oxygen oxidation, oxidative sulfonation and sulfomethylation. Oxygen alone produced a highly viscous material soluble in aqueous solution to pH 1.5. The viscosity of the oxidized material was at least five times more than that of the starting material and a significant shift to higher molecular weight was observed.

Oxidative sulfonation yielded a low viscosity product soluble to pH 1.5 in water. Sulfomethylation with 25 percent sodium sulfite gave a product containing 4.7 weight percent sulfonic sulfur.

Reaction with formaldehyde in the presence of a basic catalyst gave a highly cross-linked insoluble product while the same reaction using the original Kraft lignin material failed to give an insoluble product under similar conditions.

The above results indicate that the demethylation reaction of the invention results in lignin material of increased reactivity.

The reaction mixture that results from the demethylation reaction is poured into water whereupon the DL precipitates and is collected. The filtrate may be treated with sufficient sodium hydroxide to generate free amine which may be recovered by distillation. The distillate may be reacted with HCl and recycled to a subsequent demethylation reaction.

EXAMPLE 2

Marasperse CB, an oxidized, hydrolyzed, partially desulfonated softwood residue from a vanillin recovery process, obtained for example, as in U.S. Pat. No. 2,491,832 and containing less than about 5 weight percent of sulfonic sulfur, was demethylated with n-butyl amine upon heating for 30 minutes at 230° C. The product obtained was no longer water-soluble and was determined to be substantially devoid of sulfonic acid groups. The reaction conditions in addition to effecting demethylation, effected severe desulfonation as well. The product was demethylated, desulfonated lignin material comparable in properties to the DL derived from Kraft lignin.

Several attempts were made to demethylate crude lignosulfonates with higher sulfonic acid content. Attempts to demethylate Norlig 41, a crude spent sulfite hardwood lignosulfonate, at 180° C. were unsuccessful. Demethylation of the same material at 240° C. resulted in severe degradation of the crude lignosulfonate material.

I claim:

1. A method for demethylation of lignin materials to produce a lignin material of improved reactivity and a methyl halide which comprises reacting (1) a lignin material selected from the group consisting of (a) Kraft lignin derived by acid precipitation of black liquor and (b) purified lignosulfonates derived from spent sulfite liquor, said lignosulfonates being substantially free of reducing suguars and having a sulfonic sulfur content of less than about 5 weight percent with an amine hydrochloride or hydrobromide salt at a temperature between about 180° to 250° C.; the amine component of said salt being an aliphatic amine having a boiling point below about 100° C., said amine functioning as a hydrochloride or hydrobromide carrier in the reaction;

(2) continuing said reaction for a period sufficient to permit demethylation;

(3) recovering aliphatic amine and methyl halide as a distillate fraction produced during the reaction; and (4) recovering demethylated lignin from the reaction mixture.

2. A method as claimed in claim 1 wherein said lignin material is alkali soluble Kraft lignin derived from spent liquor of alkaline pulping.

3. A method as claimed in claim 1 wherein said amine salt is a primary aliphatic amine hydrochloride having 1 to 4 carbon atoms.

4. A method as claimed in claim 1 wherein said amine salt is n-butyl amine hydrochloride.

5. A method as claimed in claim 1 wherein said lignin material is a lignosulfonate derived from spent sulfite liquor.

6. A method as claimed in claim 5 wherein said amine salt is a primary aliphatic amine hydrochloride having 1 to 4 carbon atoms.

7. A method as claimed in claim 2 wherein said Kraft lignin is water-insoluble and soluble in aqueous alkaline solution, has a phenolic hydroxyl content of at least 5 weight percent and a methoxy content of at least 13.5 weight percent.

8. A method as claimed in claim 7 wherein said demethylation results in a lignin material having a phenolic hydroxyl content of about 10 weight percent and a methoxy content of less than 5 weight percent, said material being water-insoluble and soluble in aqueous alkaline solution.

9. A method for the demethylation of water-insoluble Kraft lignin material, derived by acid precipitation of black liquor, having a phenolic hydroxyl content of about 5 weight percent and a methoxy content of about 13.5 weight percent to produce a water-insoluble demethylated lignin having increased reactive sites, a phenolic content of about 10 weight percent and a methoxy content of less than 1 weight percent; methyl chloride; and an amine; said method comprising the steps of:

(a) reacting said Kraft lignin material with an aliphatic amine hydrochloride salt at a temperature between about 180° C. and 250° C., the amine component of said salt being an aliphatic amine having 1 to 4 carbon atoms and functioning as a hydrochloride carrier in the reaction;

(b) continuing said reaction for a period sufficient to permit demethylation;

(c) recovering amine and methyl chloride as a distillate fraction produced during the reaction; and (d) admixing the reaction mixture with water and recovering the precipitated demethylated lignin therefrom.

10. A method as claimed in claim 9 wherein said amine salt is n-butyl amine hydrochloride.

11. A water-insoluble demethylated Kraft lignin or lignosulfonate material having increased reactivity relative to said material before demethylation obtained by the method of claim 1.

12. A water-insoluble demethylated Kraft lignin material having increased reactivity relative to said material before demethylation obtained by the method of claim 9.

13. A demethylated, substantially desulfonated lignosulfonate material having increased phenolic hydroxyl content relative to said material before demethylation obtained by the method of claim 1.

14. A demethylated, substantially desulfonated lignosulfonate material having increased phenolic hydroxyl content relative to said material before demethylation obtained by the method of claim 5.

15. A method for demethylation of purified lignosulfonate derived from spent sulfite liquor, said lignosulfonate being substantially free of reducing sugars and having a sulfonic sulfur content of less than about 5 weight percent (1) reacting said ligno sulfonate with an aliphatic amine hydrochloride or hydrobromide salt having 1 to 4 carbon atoms at a temperature between about 180° to 250° C.; said amine functioning as a hydrochloride or hydrobromide carrier in the reaction;

(2) continuing said reaction for a period sufficient to permit demethylation;

(3) recovering an amine and methyl halide as a distillate fraction during the reaction; and (4) recovering demethylated, substantially desulfonated lignin from the reaction mixture.

16. A method as claimed in claim 15 wherein the amine salt is n-butylamine hydrochloride.

* * * * *